United States Patent [19]

Fabian et al.

[11] 4,116,029

[45] Sep. 26, 1978

[54] DEVICE FOR MEASURING THE FLATNESS OF METAL STRIPS

[75] Inventors: Wolfgang Fabian; Hermann-Josef Kopineck; Wilhelm Tappe, all of Dortmund, Germany

[73] Assignee: Hoesch Werke AG, Dortmund, Germany

[21] Appl. No.: 802,948

[22] Filed: Jun. 2, 1977

[30] Foreign Application Priority Data

Jul. 24, 1976 [DE] Fed. Rep. of Germany ....... 2633351

[51] Int. Cl.² ............................................ B21C 51/00
[52] U.S. Cl. .......................................... 72/34; 73/159; 72/9; 72/17
[58] Field of Search ...................... 72/9, 10, 12, 14, 16, 72/17, 34; 73/159, 144

[56] References Cited

U.S. PATENT DOCUMENTS

| 3,442,104 | 6/1969 | Misaka et al. | 72/9 |
| 3,581,536 | 6/1971 | Terwilliger | 72/9 |
| 3,817,095 | 6/1974 | Diolot | 73/159 |

*Primary Examiner*—Milton S. Mehr
*Attorney, Agent, or Firm*—Max Fogiel

[57] ABSTRACT

An arrangement for measuring the flatness or planar degree of metal strips under tensile stress while being rolled, in which measuring rollers are subdivided into roller sections. Measuring elements which may be in the form of strain gages, are held in suspensions having side members which are pivotable about a fixed axis. The side members also support the individual roller sections of the measuring rollers. The measuring elements or strain gages may be fixed in the roller bearings linking the suspension and the measuring rollers. The measuring elements may also be located in a recess of the side members. Each roller section may be provided with a measuring element, and the side members, furthermore, may be connected by rigid joints to a shaft which is reinforced by a rigid box and about which the side members are pivotable. The side members, moreover, may be T-shaped and be hinged to the rigid box, while being force-linked to a cover plate containing a recess for the measuring element. The cover plate is attached to the side of the rigid box.

5 Claims, 6 Drawing Figures

DEVICE FOR MEASURING THE FLATNESS OF METAL STRIPS

BACKGROUND OF THE INVENTION

The present invention relates to a device for measuring the flatness or planar degree of metal strips under tensile stress, particularly steel strips, during rolling while using measuring rollers, divided into roller sections, and using measuring elements.

Methods and devices for measuring the flatness or deviation from flatness of steel strips are known in the art, cf. "Stahl und Eisen" 1976, No. 1, p. 11/12. With these known methods, that flatness of cold-rolled strips is determined by magnetic measurement of internal strip stresses; on the other hand, it is possible to measure the distribution of specific tensile stresses across the strip width by means of a measuring roller. These known methods and devices permit measuring the flatness of cold-rolled strips during cold rolling, but not the flatness of strips during hot rolling. The magnetic methods cannot be used during hot-rolling because the Curie point is exceeded, while with the other known methods or the associated device, the rotating primary elements in the measuring roller are not suitable or too sensitive for measuring in the hot rolling mill due to the rough operation, including the increased temperatures.

Accordingly, it is an object of the present invention to avoid the disadvantages of the known devices and to provide an arrangement to measure the flatness or deviations from flatness of metal strips, particularly steel strips during hot rolling.

Another object of the present invention is to provide a device of the foregoing character which performs properly during rough operation of a hot rolling mill.

A further object of the present invention is to provide a device, as described, which is substantially simple on construction and may be readily maintained in service.

A still further object of the present invention is to provide a device for measuring the flatness of metal strips with the aforementioned features and having a substantially long operation life.

SUMMARY OF THE INVENTION

The objects of the present invention are achieved by providing that the measuring elements are arranged on suspensions, in the form of side members and roller bearings swiveling about a fixed axis, of the individual roller sections of the measuring rollers. The measuring elements may be located both in the roller bearings and on the side members. However, the measuring elements are preferably located in a recess on the side members.

In another preferred embodiment, the T-shaped side member (beam) is hinged to a box swiveled about the axis and force-linked to a cover plate containing the recess and the measuring element. This cover plate is attached to the side of the box. The box is already present on "loop lift rollers" (hoists) in rolling mills. Other improvements are described in the description of the drawings.

The advantages of the device in accordance with the present invention are as follows: In a simple manner, the flatness of steel strips can be measured during their hot rolling, and possible deviations from flatness can be remedied during rolling, e.g., by means of known roll-bending devices. As a result, the rolling mill can deliver a planar metal strip for further processing.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
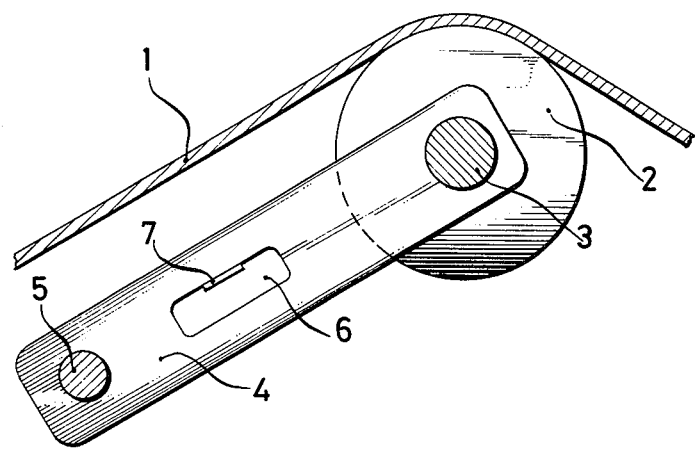
FIG. 1 shows a side view of the arrangement according to the present invention.

Referring to FIG. 1, the metal strip 1 rolls over measuring rollers 2 which are held in side members 4 by means of roller bearings 3. The side members 4 can be jointly swiveled about the fixed axis 5, as for example, by means of an electrical drive (not shown). Each side member 4 has near the midpoint between roller bearing 3 and axis 5 a through-going recess 6 in which measuring elements 7, preferably strain gages, are located.

Figure 2:
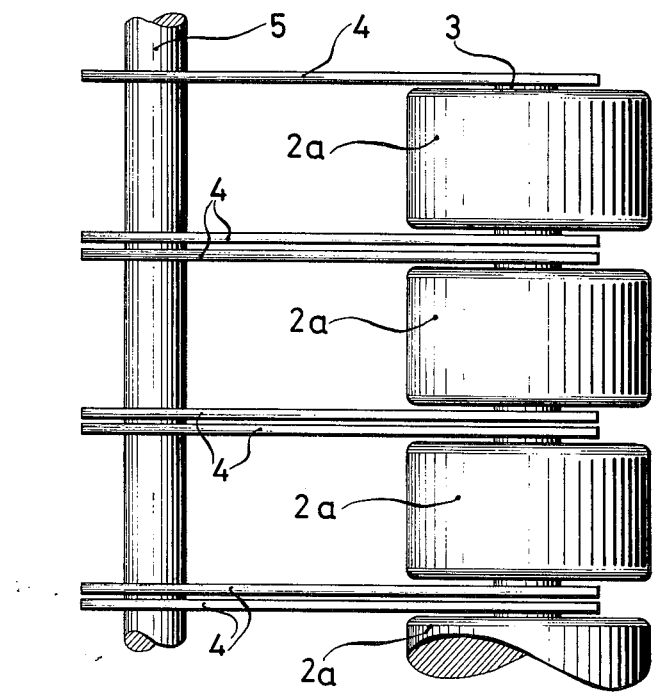
FIG. 2 shows a top view of the device of FIG. 1 without a metal strip.

Referring to FIG. 2, the measuring rollers 2 are divided across the strip width into roller sections 2a of equal width; without a load, the roller sections 2a are parallel. Even when under the load of a planar metal strip 1, the roller sections 2a remain parallel. However, if a non-planar strip portion runs over the roller sections 2a, the metal strip 1 under tension exerts different force components on the individual roller sections 2a. These force components are measured by means of the measuring elements 7. Electrical lines or conductors (not shown) lead from the measuring elements 7 to the axis 5 and from there to the device which records the measured values. This device may be located, for example, in the control panel of the rolling mill.

Figure 3:
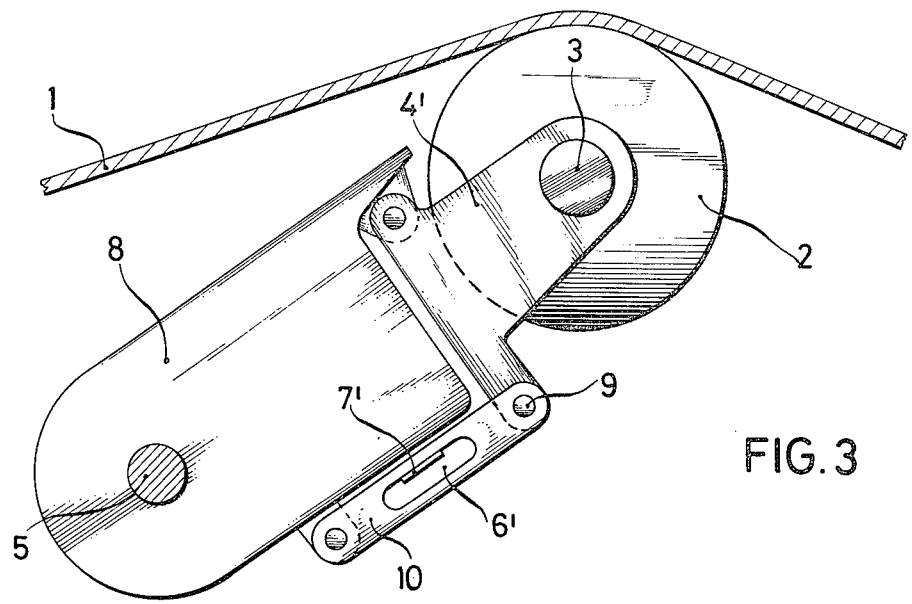
FIG. 3 shows a side view of another embodiment of the arrangement of the present invention.

In the embodiment of FIG. 3, the measuring rollers 2 are also held in side members 4' and roller bearings 3; the side members 4' are on one side directly hinged to a rigid box 8 and on the other side are force-linked via a hinge or pivot 9 to a cover plate 10 which is attached to the box 8. The rigid box 8 pivots about shaft 5.

The cover plate 10 has a through-going recess 6 which holds a measuring element 7. Via electrical lines or conductors (not shown) the measured values are transmitted to the recording device.

Figure 4:
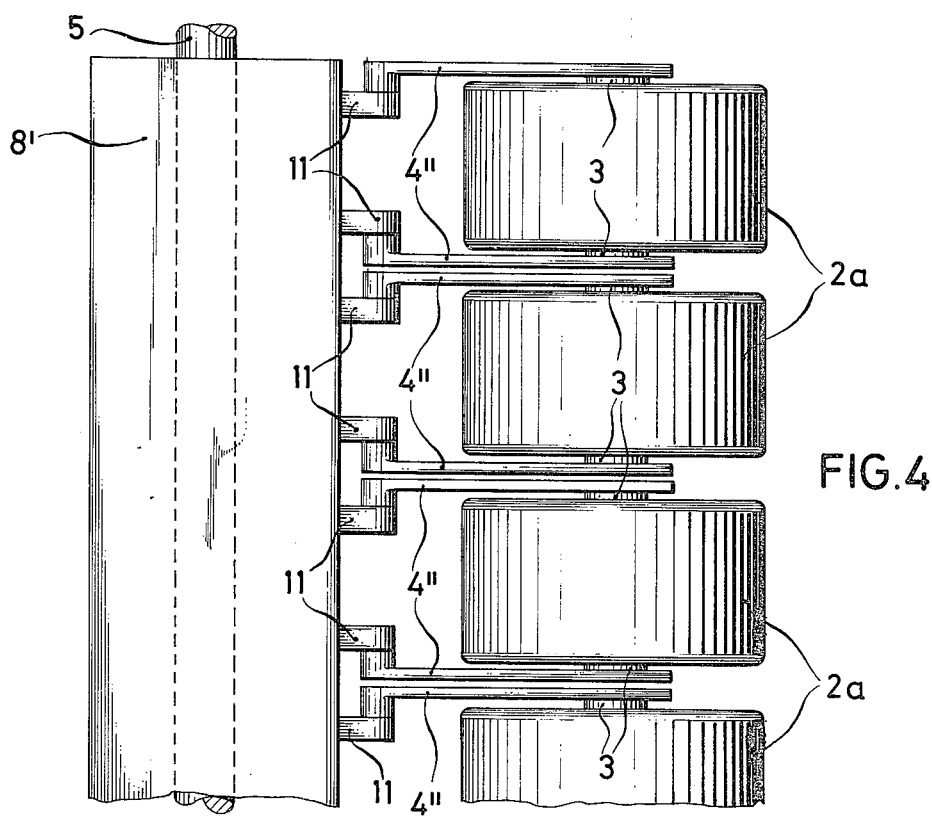
FIG. 4 shows a top view of yet another embodiment.

In the embodiment of FIG. 4, the side members 4", equipped with recesses for the measuring elements, are connected via rigid joints 11 to the shaft 5 reinforced by a rigid box 8.

Figure 5:
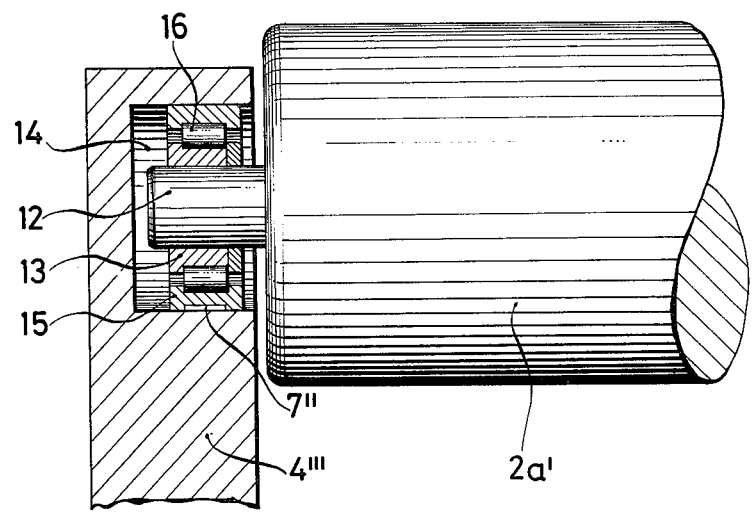
FIGS. 5 and 6 show additional embodiments, with partial sections.
Figure 6:
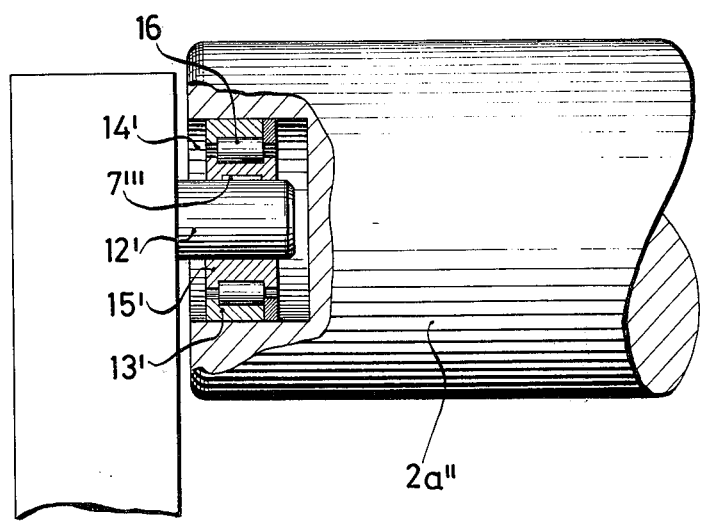

FIGS. 5 and 6 show the mounting of the roller sections 2a in the side members 4, as well as 4' and 4". According to FIG. 5, the shaft 12 of roller section 2a, which has a bearing race 13, engages a recess 14 of side member 4 which holds the fixed bearing race 15 with the measuring element 7. Roller section 2a can be rotated in bearing races 13, 15 by means of rollers or balls 16.

According to FIG. 6, shaft 12 is attached to side member 4, 4' or 4", and engages a recess 14 in the roller section 2a. The fixed bearing race 15 with measuring element 7 is located on the shaft 12, while roller section 2a is provided with bearing race 13 which turns along with it.

Without further analysis, the foregoing will so fully reveal the gist of the present invention that others can, by applying current knowledge, readily adapt it for various applications without omitting features that from the standpoint of prior art, fairly constitute essential characteristics of the generic or specific aspects of this invention, and therefore, such adaptations should and are intended to be comprehended within the meaning and range of equivalence of the following claims.

What is claimed is:

1. An arrangement for measuring the flatness of metal strips under tensile stress while being rolled, comprising: measuring roller means; measuring elements; means for carrying said measuring elements and having side members; bearing means on said side members and supporting said measuring roller means; pivot means supporting said side members, said side members being swivable about said pivot means; rigid box means reinforcing said pivot means; said means for carrying said measuring elements including cover plate means having a recess for holding said measuring element and being attached to a side of said box means; said side members being T-shaped and being pivotably connected to said box means and being pivotally connected to said cover plate means, said side members absorbing a substantial amount of force transmitted by said roller means to said side members for reducing substantially the amount of force applied to said measuring elements.

2. An arrangement as defined in claim 1, wherein said measuring roller means is divided into roller sections, each roller section of said measuring roller means having a measuring element.

3. An arrangement as defined in claim 1, wherein said measuring elements comprise strain gage means.

4. An arrangement as defined in claim 1, wherein said metal strips are being rolled in a hot rolling mill.

5. An arrangement as defined in claim 1, wherein said metal strips are rolled in a hot rolling mill, said T-shaped side members having one end of the cross portion of the T-shape comprising the pivotal connection to said box means, the other end of said cross portion comprising the pivotal connections to said cover plate, said attachment of said cover plate means to said side of said box means being a pivotal attachment being pivotable about said pivot means, said T-shape having a portion perpendicular to said cross portion and carrying said bearing means, said metal strips passing over said measuring roller means, said measuring elements comprising strain gage means, said metal strips comprising steel strips, said measuring roller means being divided into roller sections, each roller section having an associated measuring element, the force transmitted by said roller means to said side members having a direction substantially noncolinear with the direction of the force applied in reduced magnitude to said measuring elements.

* * * * *